(12) United States Patent
Teconchuk et al.

(10) Patent No.: US 8,697,174 B2
(45) Date of Patent: Apr. 15, 2014

(54) TREATS AND METHODS FOR PRODUCING SAME

(75) Inventors: Andrew T. Teconchuk, Warren, PA (US); Thomas N. Asquith, Cincinnati, OH (US); Lee Randall, Meadville, PA (US); Rhonda L. Sisson, Warren, PA (US)

(73) Assignee: Ainsworth Pet Nutrition, Meadville, PA (US)

( * ) Notice: Subject to any disclaimer, the term of this patent is extended or adjusted under 35 U.S.C. 154(b) by 866 days.

(21) Appl. No.: 12/694,823

(22) Filed: Jan. 27, 2010

(65) Prior Publication Data

US 2011/0183036 A1 Jul. 28, 2011

(51) Int. Cl.
*A23K 1/18* (2006.01)

(52) U.S. Cl.
USPC ............... 426/661; 426/61; 426/72; 426/580; 426/805

(58) Field of Classification Search
USPC ............................. 426/661, 61, 72, 580, 805
See application file for complete search history.

(56) References Cited

U.S. PATENT DOCUMENTS

| | | | |
|---|---|---|---|
| 4,039,692 A | 8/1977 | Clausen | |
| 4,159,982 A | 7/1979 | Hermansson | |
| 4,284,652 A | 8/1981 | Christensen | |
| 4,324,811 A | 4/1982 | Eugley | |
| 4,451,488 A * | 5/1984 | Cook et al. | 426/89 |
| 5,262,190 A | 11/1993 | Cunningham et al. | |
| 5,643,603 A | 7/1997 | Bottenberg et al. | |
| 5,773,070 A | 6/1998 | Kazemzadeh | |
| 5,869,121 A | 2/1999 | Brescia et al. | |
| 6,387,381 B2 | 5/2002 | Christensen | |
| 6,841,178 B2 | 1/2005 | Cupp et al. | |
| 6,865,862 B2 | 3/2005 | Huber et al. | |
| 7,125,574 B2 | 10/2006 | Cupp et al. | |
| 7,318,920 B2 | 1/2008 | Christensen | |
| 2002/0094369 A1 * | 7/2002 | Dull | 426/634 |
| 2003/0096051 A1 | 5/2003 | Huber et al. | |
| 2003/0219516 A1 * | 11/2003 | Pater et al. | 426/132 |
| 2004/0043925 A1 | 3/2004 | Kalbe et al. | |
| 2004/0086598 A1 * | 5/2004 | Maegli et al. | 426/34 |
| 2004/0086616 A1 | 5/2004 | Nie et al. | |
| 2005/0008759 A1 | 1/2005 | Nie et al. | |
| 2005/0153018 A1 | 7/2005 | Ubbink et al. | |
| 2005/0214349 A1 | 9/2005 | Nie et al. | |
| 2006/0105025 A1 | 5/2006 | Hill et al. | |
| 2006/0121095 A1 | 6/2006 | Huber et al. | |
| 2006/0183611 A1 | 8/2006 | Unlu et al. | |
| 2006/0188611 A1 * | 8/2006 | Unlu et al. | 426/89 |
| 2006/0188632 A1 | 8/2006 | Nie et al. | |
| 2006/0193959 A1 | 8/2006 | Nie et al. | |
| 2006/0222684 A1 | 10/2006 | Isele | |
| 2007/0009647 A1 | 1/2007 | Huetter et al. | |
| 2007/0031555 A1 | 2/2007 | Axelrod et al. | |
| 2007/0292594 A1 * | 12/2007 | Levin | 426/656 |
| 2008/0032033 A1 | 2/2008 | Nie et al. | |
| 2008/0260893 A1 * | 10/2008 | Giffard et al. | 426/2 |

FOREIGN PATENT DOCUMENTS

| | | |
|---|---|---|
| EP | 0 838 153 A1 | 4/1998 |
| EP | 1 354 512 A1 | 10/2003 |
| EP | 2 123 169 A1 | 11/2009 |
| WO | WO 03/088740 A1 | 10/2003 |
| WO | WO 2007/101115 A2 | 9/2007 |
| WO | WO 2009/003721 A1 | 1/2009 |

OTHER PUBLICATIONS

Sarah Koerber, "Humectants and Water Activity", 4 pages, downloaded from www.aqualab.com/education/humectants-and-water-activity/ dated Feb. 2002.*
"Water Activity Prediction", Decagon Devices, 3 pages, dated Nov. 2009, downloaded from manuals/decagon.com.*
Beuchat, L.R., "Influence of Water Activity on Growth, Metabolic Activities and Survival of Yeasts and Molds," Journal of Food Protection, vol. 46, No. 2, pp. 135-141 & 150, 1983.
Mar. 16, 2011 International Search Report issued in International Application No. PCT/US2011/022704.
Mar. 16, 2011 Written Opinion issued in International Application No. PCT/US2011/022704.

* cited by examiner

*Primary Examiner* — Chhaya Sayala
(74) *Attorney, Agent, or Firm* — Oliff PLC

(57) ABSTRACT

Treats have a water activity of less than 0.5 and good organoleptic properties. A method for obtaining such treats having low water activity involves injection molding a dough made from a polyol and at least one of a source of casein and a source of starch.

46 Claims, No Drawings

TREATS AND METHODS FOR PRODUCING SAME

BACKGROUND

The present disclosure is generally directed to pliable treats such as pet treats having low water activity levels, and methods for producing such treats by injection molding.

U.S. Patent Application Publication No. 2007/0009647 discloses a pet food composition with a prolonged chew time. The pet food includes a protein and humectant and can be made by baking, extrusion, injection molding, transfer molding, and/or compression molding. However, because the pet food has a water activity level in the range of 0.6 to 0.8, it can be subject to growth of a number of microorganisms that can lead to spoilage, including, for example, *Aspergillus restrictus*, which is capable of growing and thriving at water activity levels greater than 0.65 (see Beuchat, L. R. 1983. Influence of water activity on growth, metabolic activities, and survival of yeasts and molds. J Food Prot 46:135-141, 150).

U.S. Patent Application Publication No. 2007/0292594 discloses a plant material pet treat. The plant material pet treat includes at least about 50% by weight textured plant based protein material, 3 to 30% by weight humectant, 3 to 25% by weight water and a water activity of about 0.4 to 0.85. The plant material pet treat is prepared without the use of carbohydrates. The range of water activity of this pet treat also encompasses levels that allow a number of microorganisms to grow and exist in the pet treat, including, for example, most halophilic bacteria and mycotoxigenic aspergilla, which are capable of growing and thriving at water activity levels greater than 0.75 (see Beuchat, L. R. 1983. Influence of water activity on growth, metabolic activities, and survival of yeasts and molds. J Food Prot 46:135-141, 150).

U.S. Patent Application Publication No. 2006/0193959 discloses low calorie injection molded starch-based pet chew products. The pet chew products include a resistant starch, a plasticizer, water and a lubricant, and have a water activity of less than 0.7. The range of water activity of this pet treat also encompasses levels that allow a number of microorganisms to grow and exist in the pet treat, including, for example, xerophilic molds (*Aspergillus chevalieri, A. Candidus, Wallemia sebi*) and *Saccharomyces bisporus*, which are capable of growing and thriving at water activity levels of 0.65 and greater (see Beuchat, L. R. 1983. Influence of water activity on growth, metabolic activities, and survival of yeasts and molds. J Food Prot 46:135-141, 150). The pet chew products can be made by injection molding or extrusion molding. In the injection molding process, the barrel temperature of the molding press is kept from 100° C. to 140° C. to guarantee molding; otherwise the molding is difficult due to high melt viscosity. Unfortunately, the high barrel temperature likewise generates high production costs and equally high energy expenditures, and does not permit preparation of products with temperature sensitive ingredients.

U.S. Pat. No. 5,262,190 discloses a meat-based snack food product in the form of an expanded cellular body defined by a multitude of cell-defining walls. The walls include about 5% meat and 50% wheat. The snack food is prepared without the use of polyols, and has a water activity of less than 0.65. The range of water activity of this product encompasses levels that allow a number of microorganisms to grow and exist in the pet treat, including, for example, *Saccharomyces bisporus* and *Monascus bisporus*, which are capable of growing and thriving at water activity levels of 0.65 and greater (see Beuchat, L. R. 1983. Influence of water activity on growth, metabolic activities, and survival of yeasts and molds. J Food Prot 46:135-141, 150). The snack food product is made by extrusion molding, at a mixture temperature of up to about 138° C. Unfortunately, the high mixture temperature does not permit preparation of products with temperature sensitive ingredients.

Extrusion molding is a process for producing two-dimensional shapes that are continuous in length. In extrusion molding, material is pushed through a two-dimensional die opening, cooled, and the extrudate is coiled or cut into various lengths for further use. Injection molding is a process for producing three-dimensional shapes by injecting material into one or more mold cavities in a three-dimensional mold. Unlike extrusion molding, injection molding applies pressure to injected material in a mold, and as a result, a tougher, stronger, and denser product can be formed.

Extrusion molding processes are typically run at higher temperatures than injection molding. A considerable amount of steam is used during extrusion molding. As a result, products made by extrusion molding often have less temperature sensitive ingredients and a higher water activity level compared to similar products made by injection molding.

Furthermore, when a material is processed by an extruder during extrusion molding, the material is often sheared to a greater extent than by injection molding. The shear rate is a function of the flow rate and size of the flow channel. In some cases, the effect of shear rate on material properties can be great. For instance, with respect to grains, a high shear rate can cause degradation of starches and proteins. grains to gelatinize and melt during processing.

SUMMARY

The present disclosure provides methods for producing a treat having low water activity by injection molding, and treats that may be prepared by said methods.

The present disclosure provides treats comprising a polyol and at least one of a source of casein and a source of starch, and a water activity that is less than 0.5, and preferably less than 0.4 or 0.3, preferably with 3 to 15 wt. % water.

In embodiments, methods for producing a low water activity treat comprise preparing a dough, feeding the dough through a barrel, and injection molding the dough into a mold to form said treat with a water activity that is less than 0.5.

Embodiments of the treats have desirable organoleptic properties such as good pliability, and embodiments are suitable for delivery of temperature sensitive nutraceuticals and the like.

EMBODIMENTS

The Federal Food, Drug and Cosmetic Act requires that pet foods and pet treats be pure and wholesome, containing no harmful or deleterious substances. Pet food safety is gaining increased attention as a result of several high profile product recalls that have occurred in the past years. Microbial spoilage caused by yeast, bacteria or mold is one of the most common causes of pet food product recalls.

Bacteria, yeast and molds in pet foods require a certain level of available water in order to grow. Below certain levels of water activity microbes simply cannot grow, making water activity important in establishing pet food quality, safety and shelf life. Thus, water activity plays a significant role in: (1) controlling the growth of bacteria, yeast, molds, and toxins; (2) preventing infestation; and (3) promoting chemical and physical stability in pet treats.

Molds can grow at water activity levels as low as 0.61 (see Beuchat, L. R. 1983. Influence of water activity on growth, metabolic activities, and survival of yeasts and molds. J Food Prot 46:135-141, 150).

Toxins, such as mycotoxins, may be formed during the course of microbial growth in pet treats. Mycotoxin formation depends on the type of mold, substrate, and storage conditions, which include but are not limited to acidity levels (pH) and water activity. For instance, mycotoxins can form on cereal grains such as corn and wheat. Although high processing temperatures can kill the mold, they may not remove toxins that may have already formed. They can also adversely affect temperature-sensitive ingredients in a treat, such as nutraceuticals and natural colorants.

Infestation is another potential problem relating to the storage of pet foods, which in some instances can be controlled by controlling water activity. For example, mites can be found active at 5° C. above 0.65 $a_w$, at 25° C. above 0.63 $a_w$, and at 40° C. above 0.6 $a_w$.

Water activity ($a_W$) should not be confused with moisture content. Moisture content is the combination of free and bound moisture in a product. The relationship between moisture content and water activity depends on the particular composition. For example, silicon dioxide could absorb water up to 50% moisture content and maintain a very low water activity, while crystalline sucrose only has to absorb a small amount of water before reaching a water activity of 0.8. Though it is true that bacteria, yeast and mold require a certain level of moisture to survive, in many instances water activity can serve as a better indicator to monitor product quality and safety.

Water activity refers to the amount of water in a composition that is not bound to other molecules, and therefore is available, for example, to support the growth of biological organisms such as bacteria, yeasts, molds, and the like. In addition to affecting microbial growth of a composition or a product, the water activity of a product also has a direct impact on characteristics such as: shelf life, product texture, moisture migration, and caking and clumping, to name a few The water activity of a particular composition can be expressed as a ratio of the water vapor pressure of the composition to the water vapor pressure of pure water under the same conditions, as expressed by the following formula:

$$a_w = \frac{p}{p_o}$$

where
$a_w$=water activity
p=water vapor pressure of composition
$p_o$=water vapor pressure of pure water Water activity is measured by a scale that extends from 0 (oven-dried silica) to 1 (pure water).

The following table illustrates the water activity level for growth of common spoilage microorganisms (adapted from Beuchat, L. R. 1983. Influence of water activity on growth, metabolic activities, and survival of yeasts and molds. J Food Prot 46:135-141, 150):

TABLE 1

Water Activity Level for Growth of Common Spoilage Microorganisms

| Water Activity ($a_w$) | Microorganisms generally inhibited by water activity at this level |
|---|---|
| 0.95 | Pseudomonas, Proteus, Shigella, Klebsiella, Bacillus, Clostridium perfringens, some yeasts, Escherichia coli |
| 0.91 | Salmonella, Vibrio parahaemolyticus, C. botulinum, Serratia, Lactobacillus, Pediococcus, some molds, Rhodotorula, Pichia, Bacillus cereus |
| 0.87 | Many yeasts (Candida, Torulopsis, Hansenula), Micrococcus |
| 0.77 | Aspergillus niger; Aspergillus ochraceous |
| 0.75 | Most halophilic bacteria, mycotoxigenic aspergilla, Aspergillus candidus, Aspergillus restrictus |
| 0.7 | Eurotium amstelodami |
| 0.65 | Xerophilic molds (Aspergillus chevalieri, A. Candidus, Wallemia sebi), Saccharomyces bisporus |
| 0.60 | Osmophilic yeasts (Saccharomyces rouxii), few molds (Aspergillus echinulatus, Monascus bisporus) |

Although temperature, acidity level (pH) and other factors can influence whether and how quickly bacteria and other microorganisms will grow in a product, water activity is still one of the most important factors in controlling spoilage to address safety concerns and lead to increased shelf life of pet foods and treats.

In addition, while controlling water activity, proper texture, structure, and density should be achieved.

Pet treats are commonly found in the form of a biscuit, bone, chew, strip, wafer, or rod. These treats can either be dry or semi-moist or pliable.

Generally, the more pliable or moist a treat is, the more palatable it is. Although dry pet foods are stable and relatively easy to handle and store, they are not as palatable as more moist pet foods.

Hard treats fall typically in the range of 0.4 to 0.45 $a_w$. At this low level of available water, microbial stability is usually not an issue.

Pliable treats typically fall in an intermediate range of 0.6 to 0.8 $a_w$. As a result, additional processing steps such as pasteurization, pH control, or the addition of preservatives may be required for production of pliable treats. Each of these steps comes with potential adverse consequences such as added time and increased costs and burden, and adverse effects on temperature-sensitive ingredients and organoleptic properties.

As a result, in developing a semi-moist or pliable treat, there are multiple manufacturing, product development and operational cost considerations that must be addressed, especially when seeking to achieve a pliable treat also having low water activity.

Embodiments provide a method of producing treats by injection molding that have low water activity level, and that remain pliable and likewise palatable.

In embodiments, a treat dough mixture is initially prepared in a mixer at a mixing temperature, $T_{Mix}$, satisfying the range of 15° C.≤$T_{Mix}$≤40° C., such as 20° C.≤$T_{Mix}$≤35° C. In embodiments, the dry ingredients are first measured and weighed, after which liquid ingredients are sprayed or atomized into the dry ingredients.

The treat dough is mixed until a homogeneous mixture is obtained. In embodiments, a suitable mixer includes a paddle ribbon mixer.

In embodiments, after mixing in the mixer, the dough can optionally be cured in a temperature and humidity controlled environment for 16 to 24 hours or longer, as desired. In embodiments, after curing, the dough mixture is sent through a grinder or granulator to break the dough mixture into smaller pieces, prior to being fed into an injection unit.

In embodiments, the dough mixture is then fed into the injection unit.

In embodiments, a suitable injection unit comprises a barrel that is fed at an upstream end by a hopper containing a supply of dough for making the treat, and injects dough into an injection mold at a downstream end.

The temperature of the dough may be measured by inserting a temperature-reading probe into the center of the dough after it has been mixed, e.g. at the downstream end of the barrel.

In high temperature embodiments, the temperature of the dough reaches temperatures greater than about 85° C. during mixing; and in low temperature embodiments, the dough is maintained at temperatures less than about 55° C. during mixing.

In high temperature embodiments, because the dough is heated to temperatures above approximately 85° C., bacteria that may have been initially present in the ingredients are killed.

In high temperature embodiments, frictional heat that is created during the injection molding process can increase sterilization, flavor formation, and color formation of the treat.

In low temperature embodiments, the low temperature of the dough permits the addition of additives that are sensitive to high temperatures, such as nutraceuticals (e.g. probiotics, prebiotics, antioxidants, vitamins, glucosamine, chondroitin, and others) and natural colorants. The lower temperature of the dough also typically makes it necessary to select ingredients that do not contain undesired live bacteria or other undesired microorganisms.

In embodiments, a screw located inside the barrel rotates for mixing and heating of the dough, and acts as a ram to inject the dough into the mold cavity.

In embodiments, a non-return valve located near the tip of the screw prevents the dough from flowing backward along screw threads.

In embodiments, temperatures vary across zones in the barrel when using compression screws, whereas temperatures remain relatively constant with conveyor screws.

In low temperature embodiments the barrel is preferably chilled; whereas in high temperature embodiments the barrel may optionally be heated during injection molding.

In embodiments, the temperature of the barrel, $T_B$, satisfies the range of 27° C.$\leq T_B \leq$121° C.

In low temperature embodiments, the temperature of the barrel, $T_B$, satisfies the range of 27° C.$\leq T_B \leq$66° C., such as 35° C.$\leq T_B \leq$55° C., or 40° C.$\leq T_B \leq$50° C.

In high temperature embodiments, the temperature of the barrel, $T_B$, satisfies the range of 75° C.$\leq T_B \leq$121° C., such as 95° C.$\leq T_B \leq$115° C., or 100° C.$\leq T_B \leq$110° C.

In low temperature embodiments, the dough structure and composition minimize heat that is caused by compression, screw speed, and design of the screw. In high temperature embodiments, the dough structure and composition may be adjusted to increase the amount of heat caused by compression, screw speed, and design of the screw.

In embodiments, frictional heat can be minimized by adding emulsifiers, vegetable oils, or food release agents. As emulsifiers, a suitable example includes calcium stearate.

In embodiments, upon mixing, the dough forms into a powder or a coarse granular structure. The consistency and texture of the dough feels similar to semi-wet sand when freshly mixed.

In embodiments, the injection molding process is conducted at an injection molding pressure of 5,000 to 80,000 psi, such as 10,000 to 30,000 psi, or 20,000 to 60,000 psi depending on the type of injection apparatus.

In embodiments, less back pressure (0 to 1000 psi) and slower injection speeds help minimize dough heating within the barrel.

Low temperature embodiments typically require high torque and low rotational speed of the screw in order to minimize heat.

In embodiments, once the dough is ready to be injected into the mold, a clamping unit holds two halves of the mold in proper alignment with each other and keeps the mold closed during injection by applying a clamping force that is sufficient to overcome the injection force. In embodiments, the clamping unit opens and closes the mold at appropriate times during the molding cycle.

In embodiments, the injection molding is conducted at an injection speed of 0.5 inches/second to 6 inches/second.

After a suitable amount of time has passed and the dough is ready to be ejected from the mold, in embodiments, ejector pins move in a direction outward from the mold die and the final product falls into a bin.

In embodiments, the temperature of the mold is below room temperature.

In embodiments, the mold temperature $T_{Mold}$ satisfies the range of $-7°$ C.$\leq T_{Mold} \leq 49°$ C., such as 0° C.$\leq T_{Mold} \leq 35°$ C., or 10° C.$\leq T_{Mold} \leq 25°$ C.

If desired, water activity can be further reduced by secondary processes such as curing in a low humidity environment. In embodiments, curing is conducted at a temperature ranging from 20° C. to 38° C., at a relative humidity of 20% or less.

In embodiments, once the injection molded treat reaches ambient temperature, the treat is packaged immediately to prevent the products from absorbing environmental moisture and prevent the water activity from rising. Alternatively or in addition, the products can be packaged under low moisture atmosphere or vacuum sealed.

In embodiments, treats prepared by the methods described above comprise a polyol, and at least one selected from a source of casein and a source of starch. In embodiments, each component has a low moisture content by weight.

In embodiments, suitable polyols include glycerin and propylene glycol. In high temperature embodiments, a suitable polyol may also include solid polyols.

As solid polyols, suitable examples include sorbitol, erythritol, maltitol, mannitol, and xylitol.

As a source of casein, in preferred high temperature embodiments, suitable examples include caseinates and milk powder, cheese powder, milk concentrates, milk isolates, evaporated milks, cheeses, cream cheeses, sour creams, dried sour creams, yogurts, dried yogurts, or mixtures thereof. In preferred low temperature embodiments, suitable examples of a source of casein include caseinates, such as sodium caseinate.

As a source of starch, in preferred high temperature embodiments, suitable examples include starch, flours and finely ground grains. In preferred low temperature embodiments, suitable examples include starch, flours and pre-gelatinized starches. As flours, suitable examples include tapioca flour, potato flour, oat flour, pea flour, rice flour, sweet potato flour, and other root, vegetable, fruit, grain and nut flours.

In preferred high temperature embodiments, the treat comprises about 5 to 40 wt. %, milk powder, cheese powder, milk concentrates, milk isolates, evaporated milks, cheeses, cream cheeses, sour creams, dried sour creams, yogurts, dried yogurts, or mixtures thereof, such as 10 to 30 wt. %, or 15 to 25 wt. % milk powder, cheese powder, milk concentrates, milk isolates, evaporated milks, cheeses, cream cheeses, sour creams, dried sour creams, yogurts, dried yogurts, or mixtures thereof.

In preferred high temperature embodiments, the treat comprises about 35 to 60 wt. % flour(s), such as 40 to 55 wt. %, or 45 to 50 wt. %. flour(s).

In preferred high temperature embodiments, the treat comprises 5 to 55 wt. % polyol, such as 15 to 45 wt. %, or 25 to 35 wt. % polyol.

In preferred high temperature embodiments, the treat comprises 0 to 10 wt. % fat(s), such as 2 to 8 wt. %, or 5 to 7 wt. % fat(s).

In preferred high temperature embodiments, the treat comprises 0 to 40 wt. % additives, such as 15 to 35 wt. %, or 20 to 30 wt. % additives. Unless otherwise indicated, weight percents are percentages based on the total weight of the composition.

In exemplary high temperature embodiments, the treat comprises 8 to 50 wt. % glycerin, such as 15 to 45 wt. %, or 25 to 35 wt. % glycerin.

In preferred low temperature embodiments, the treat comprises 25 to 70 wt. % pre-gelatinized starch, such as 35 to 65 wt. %, or 40 to 55 wt. % pre-gelatinized starch.

In preferred low temperature embodiments, the treat comprises 5% to 55 wt. % polyol, such as 15 to 45 wt. %, or 25 to 35 wt. % polyol.

In preferred low temperature embodiments, the treat comprises 5 to 40 wt. % spray dried protein, such as 15 to 35 wt. %, or 20 to 30 wt. % spray dried protein. Suitable spray dried proteins include sodium caseinate.

In preferred low temperature embodiments, the treat comprises 0 to 10 wt. % fat(s), such as 2 to 8 wt. %, or 5 to 7 wt. % fat(s).

In preferred low temperature embodiments, the treat comprises 0 to 40 wt. % additives, such as 10 to 35 wt. %, or 15 to 25 wt. % additives.

In exemplary low temperature embodiments, the treat comprises 8 to 50 wt. % glycerin, such as 15 to 45 wt. %, or 25 to 35 wt. % glycerin, and/or 8 to 50 wt. % propylene glycol, such as 15 to 45 wt. %, or 25 to 35 wt. % propylene glycol.

In embodiments, suitable fats include vegetable based fats and animal based fats. As vegetable based fats, suitable examples include corn oil, vegetable oil, soybean oil, medium chain triglycerides, and any oil product of vegetable origin obtained by extracting oil from seeds or fruits that are processed for ingestion.

In embodiments, suitable additives include pre-biotics, enzymes, such as for dental care, and palatants. As palatants, suitable examples include poultry flavoring, poultry digest, and liver digest.

In low temperature embodiments, suitable additional or alternative additives also include calcium stearate, spray dried protein, natural colorants, and any additive ingredient stable at low moisture and low temperature. As a spray dried protein additive, suitable examples include pea proteins and alfalfa extract.

In high temperature embodiments, suitable additional or alternative additives also include calcium stearate, dried fruit, vegetables, protein, and any additive ingredient stable at low moisture and high temperature. As a protein, suitable examples include dried egg and gelatin.

In low temperature embodiments, the treat can further include at least one of nutraceuticals, such as probiotics, pre-biotics, antioxidants, vitamins, glucosamine and chondroitin.

In preferred low temperature embodiments, no water is added to the dough, whereas in high temperature embodiments, a small amount of water may be added to the dough. This amount will vary depending on the desired water activity of the final product.

In embodiments, the water content of the treat is from 3 to 15 wt. %, such as 5 to 10 wt. %, or 7 to 9 wt. %.

In embodiments, no meat flavorings other than poultry flavorings are added.

In embodiments, no aromatic agents or sugars or sweetening agents are added.

In embodiments, no gluten is added.

In embodiments, the treat is resistant to the growth of bacteria, yeast and molds.

In embodiments, the treat is pliable, imparting desirable organoleptic properties to the product.

In embodiments, the treat is dry and not sticky, releases from the mold, and the texture ranges from soft and crumbly, to hard and cohesive, to having a non-sticky, taffy-like plastic consistency.

Treats according to the present disclosure are especially suitable for pets, (i.e. an animal that is tamed or domesticated and kept for pleasure as a companion rather than utility), but are also useful for other animals including but not limited to domesticated animals, farm animals, wild animals, exotic pets, and humans.

DEFINITIONS

As used herein, "room temperature" is defined as the temperature within enclosed space at which humans are accustomed, within the range of 20° C. to 25° C.

As used herein, the term "nutraceutical" is defined as any substance that is a food or a part of a food and provides medical or health benefits, including, but not limited to, the prevention, avoidance, and/or treatment of disease. Examples of nutraceuticals include but are not limited to isolated nutrients, vitamins, probiotics, prebiotics, glucosamine, chondroitin, dietary supplements, and the like. Nutraceutical applies to all categories of food and parts of food, ranging from dietary supplements such as folic acid, used for the prevention of spina bifida, to chicken soup, typically taken to lessen the discomfort of the common cold. This definition also includes a bio-engineered designer vegetable food, rich in antioxidant ingredients, and a stimulant functional food or pharmafood.

Examples are set forth and are illustrative of different pet treat compositions and conditions that can be utilized in practicing the disclosure. All proportions are by weight unless otherwise indicated. It will be apparent, however, that the disclosure can be practiced with many types of treat compositions.

EXAMPLES

Examples 1-4

Four pet treat compositions were prepared by forming a mixture comprising portions of glycerin; skim milk powder; cheese powder; sweet potato flour; rice flour; pea flour; tapioca flour; oat flour; potato flour; smoke flavor; dried carrots; and/or parsley flakes in the amounts shown in Table 2.

To prepare the pet treats, the dry ingredients were measured and then combined until a homogeneous mixture was reached. The liquid ingredients were then sprayed or atomized into the dry ingredients to ensure there were no clumps formed.

The resulting batch mixture was then cured in a temperature and humidity controlled environment. The batch mixture was then sent through a grinder or granulator to break up the mixture into pieces prior to being fed into the injection molding apparatus.

The dough was heated up to 82° C. in the barrel, and the temperature of the barrel was maintained between 82 to 121° C.

TABLE 2

| | | | | | | | | |
|---|---|---|---|---|---|---|---|---|
| High Temperature Application | | | | | | | | |
| Exp # | Glycerin | Skim Milk Powder | Cheese Powder | Flour 1 | Flour 2 | Additives | Aw Dough | Aw Product |
| 1 | 30 | 24 | x | 24[a] | 21.4[b] | 0.6[g] | 0.23 | 0.3 |
| 2 | 24 | 24 | x | 24[a] | 24[c] | 4[h] | 0.21 | 0.24 |
| 3 | 24.85 | 24.85 | x | 24.85[d] | 24.85[e] | 0.6[g] | 0.24 | 0.3 |
| 4 | 24.9 | x | 24.9 | 24.9[a] | 24.9[f] | 0.4[i] | 0.23 | 0.25 |

[a] = sweet potato flour,
[b] = rice flour,
[c] = pea flour,
[d] = tapioca flour,
[e] = oat flour,
[f] = potato flour,
[g] = smoke flavor,
[h] = dried carrots,
[i] = parsley flakes,
x = none

Examples 5-7

Three pet treat compositions were prepared by forming a mixture comprising portions of glycerin; propylene glycol; low fat sodium caseinate; corn starch; potato starch; tapioca starch; calcium stearate; and/or corn oil in the amounts shown in Table 3.

To prepare the pet treats, the dry ingredients were measured and then combined until a homogeneous mixture was reached. The liquid ingredients were then sprayed or atomized into the dry ingredients to ensure there were no clumps formed.

The resulting batch mixture was then cured in a temperature and humidity controlled environment. The batch mixture was then sent through a grinder or granulator to break up the mixture into pieces prior to being fed into the injection molding apparatus.

The dough was heated to no greater than 49° C. in the barrel, and the temperature of the barrel was maintained between 27 to 66° C.

The pet treats did not exhibit a rubbery and/or taffy like consistency.

TABLE 3

| | | | | | | | | |
|---|---|---|---|---|---|---|---|---|
| Low Temperature Application | | | | | | | | |
| Exp # | Glycerin | Propyl. Glycol | Na Casein. | Starch #1 | Starch #2 | Ca Stearate | Corn Oil | Aw Product |
| 5 | 40 | x | 8 | 52[b] | x | x | x | 0.25 |
| 6 | x | 33.3 | 7.8 | 58.9[c] | x | x | x | 0.32 |
| 7 | 29.065 | 7.843 | 22.749 | 34.461[a] | x | 4.902 | .98 | 0.34 |

[a] = corn starch,
[b] = potato starch,
[c] = tapioca starch,
x = none
Propyl. Glycol = propylene glycol,
Na Casein. = low fat sodium caseinate

Examples 8-9

Three pet treat compositions were prepared by forming a mixture comprising portions of glycerin; propylene glycol; low fat sodium caseinate; corn starch; potato starch; tapioca starch; and/or whey concentrate in the amounts shown in Table 4.

To prepare the pet treats, the dry ingredients were measured and then combined until a homogeneous mixture was reached. The liquid ingredients were then sprayed or atomized into the dry ingredients to ensure there were no clumps formed.

The resulting batch mixture was then cured by an optional step in a temperature and humidity controlled environment. The batch mixture was then sent through a grinder or granulator to break up the mixture into pieces prior to being fed into the injection molding apparatus.

The dough was heated to no greater than 49° C. in the barrel, and the temperature of the barrel was maintained between 27 to 66° C.

The pet treats exhibited a rubbery and/or taffy like consistency.

TABLE 4

Low Temperature Application

| Exp # | Glycerin | Propyl. Glycol | Na Casein. | Starch #1 | Starch #2 | Whey Conc | Aw Product |
|---|---|---|---|---|---|---|---|
| 8 | 29 | 7.4 | 21.2 | 21.2$^c$ | 21.2$^d$ | x | 0.27 |
| 9 | 33.6 | x | x | 59.9$^b$ | x | 6.5 | 0.25 |

$^b$ = potato starch,
$^c$ = tapioca starch,
$^d$ = wheat starch,
x = none
Propyl. Glycol = propylene glycol,
Na Casein. = low fat sodium caseinate,
Whey Conc = whey concentrate

Examples 10-12

Three pet treat compositions were prepared according to the ingredients and amounts shown in Tables 5-7.

Three pet treat compositions were prepared by forming a mixture comprising portions of glycerin; propylene glycol; low fat sodium caseinate; corn starch; potato starch; tapioca starch; and/or whey concentrate in the amounts shown in Table 4.

To prepare the pet treats, the dry ingredients were measured and then combined until a homogeneous mixture was reached. The liquid ingredients were then sprayed or atomized into the dry ingredients to ensure there were no clumps formed.

The resulting batch mixture was then cured in a temperature and humidity controlled environment. The batch mixture was then sent through a grinder or granulator to break up the mixture into pieces prior to being fed into the injection molding apparatus.

The percent moisture of the resulting pet treats ranged from 3.19% to 6.47%.

TABLE 5

Percent Moisture Exp. # 10

| Ingredient | % of formula | % moisture of ingredient | % Moisture |
|---|---|---|---|
| Glycerin | 50 | 0.5 | 0.025 |
| Low fat casein | 8 | 8 | 0.64 |
| Potato Starch | 42 | 5.9 | 2.52 |
| | | | 3.19 |

TABLE 6

Percent Moisture Exp. # 11

| Ingredient | % of formula | % moisture of ingredient | % Moisture |
|---|---|---|---|
| Propylene Glycol | 42 | 1 | 0.04 |
| Low fat casein | 8 | 8 | 0.64 |
| Potato Starch | 50 | 5.9 | 3 |
| | | | 3.68 |

TABLE 7

Percent Moisture Exp. # 12

| Ingredient | % of formula | % moisture of ingredient | % Moisture |
|---|---|---|---|
| Propylene Glycol | 33.3 | 1 | 0.33 |
| High fatcasein | 7.8 | 4.4 | 0.34 |
| Tapioca Starch | 58.8 | 10.1 | 5.8 |
| | | | 6.47 |

Examples 13-18

Six dough compositions were prepared according to the ingredients and amounts shown in Table 8. The dough properties and resulting pet treat properties were recorded.

To prepare the pet treats, the dry ingredients were measured and then combined until a homogeneous mixture was reached. The liquid ingredients were then sprayed or atomized into the dry ingredients to ensure there were no clumps formed.

The resulting batch mixture was then cured in a temperature and humidity controlled environment. The batch mixture was then sent through a grinder or granulator to break up the mixture into pieces prior to being fed into the injection molding apparatus.

Observations of the dough were made at the time the dough was placed into the feed throat of the injection molding apparatus. Examples 13, 14, 17 and 18 appeared to feed well into the feed throat, whereas Examples 15 and 16 had more of a sticky consistency. All of the dough from Examples 13-18 yielded pet treats having, among other properties, a water activity under 0.4.

TABLE 8

| Exp # | Glycerin | Propyl Glycol | Na Casein. | Whey Conc. | Starch #1 | Starch #2 | Starch #3 | Ca Stearate | Liver Digest | Aw | Dough Observations at time of Feeding | Piece Properties |
|---|---|---|---|---|---|---|---|---|---|---|---|---|
| 13 | 39.6 | x | 6.9 | x | 51.7[b] | x | x | x | 1.9 | 0.25 | feeds well | solid |
| 14 | x | 33.3 | 7.8 | x | x | x | 58.8[c] | x | x | 0.32 | feeds well | crumbles |
| 15 | x | 33.1 | 10.5 | x | x | 55.6[d] | x | x | x | 0.3 | sticky | sticky |
| 16 | 22.2 | x | 11.1 | x | x | 55.6[d] | 11.1[c] | x | x | 0.38 | sticky | solid |
| 17 | 13.8 | x | 34.5 | x | x | x | 51.7[c] | x | x | 0.4 | feeds well | sticky/brittle |
| 18 | 27.1 | x | x | 46.4 | x | x | 26.5[c] | x | x | 0.4 | feeds well | hard/brittle |

[b] = Gel. potato starch,
[c] = Gel. tapioca starch,
[d] = Gel. rice starch,
x = none It will be appreciated that various of the above-disclosed and other features and functions, or alternatives thereof, may be desirably combined into many other different products or applications, and the disclosure encompasses all combinations of the above embodiment features. Also, various presently unforeseen or unanticipated alternatives, modifications, variations or improvements therein may be subsequently made by those skilled in the art, and are also intended to be encompassed by the following claims.

The disclosures of the foregoing publications are hereby incorporated by reference herein in their entirety. The appropriate components and process aspects of the foregoing publications may also be selected for the present compositions and processes in embodiments thereof.

What is claimed is:

1. A pet treat formed by:
    preparing a dough in a mixer, the dough comprising
        a polyol, and
        at least one member selected from the group consisting of a source of casein and a source of starch; and
    injection molding the dough by injecting the dough from an injection barrel into a mold to form said treat, the pet treat having a water activity of from 0.24 to 0.34,
    wherein a temperature of the dough in the barrel reaches temperatures greater than 82° C.

2. The pet treat of claim 1, wherein the polyol is at least one member selected from the group consisting of glycerin, propylene glycol, and solid polyol.

3. The pet treat of claim 1, wherein the source of casein is present and is at least one member selected from the group consisting of caseinate, milk powder, cheese powder, milk concentrate, milk isolate, evaporated milk, cheese, sour cream, yogurt, and mixtures thereof.

4. The pet treat of claim 1, wherein the source of starch is present and is at least one member selected from the group consisting of flour and finely ground grain.

5. The pet treat of claim 1, wherein the pet treat comprises:
    (a) 5 to 40 wt. % milk power, cheese powder, milk concentrate, milk isolate, evaporated milk, cheese, sour cream, yogurt, or mixtures thereof;
    (b) 35 to 60 wt. % flour;
    (c) 5 to 55 wt. % polyol;
    (d) 0 to 10 wt. % fat(s); and
    (e) 0 to 40 wt. % additive.

6. The pet treat of claim 5, wherein at least one said additive is present and comprises at least one additive that is stable at water content of from 3 to 15% and a temperature greater than 82° C.

7. The pet treat of claim 6, wherein the additive comprises at least one member selected from the group consisting of fruits and vegetables.

8. The pet treat of claim 5, wherein at least one said fat is present and comprises at least one member selected from the group consisting of vegetable oil, medium chain triglycerides, and animal fat.

9. The pet treat of claim 1, wherein the pet treat comprises 8 to 50 wt. % glycerin.

10. A pet treat formed by:
    preparing a dough in a mixer, the dough comprising
        a polyol, and
        at least one member selected from the group consisting of a source of casein and a source of starch; and
    injection molding the dough by injecting the dough from an injection barrel into a mold to form said treat, the treat having a water activity of from 0.24 to 0.34,
    wherein a temperature of the dough in the barrel does not exceed 55° C.

11. The pet treat of claim 10, wherein the water activity is less than 0.3.

12. The pet treat of claim 10, wherein the polyol comprises at least one member selected from the group consisting of glycerin and propylene glycol.

13. The pet treat of claim 10, wherein the source of starch is present and is at least one member selected from the group consisting of flour and pre-gelatinized starch.

14. The pet treat of claim 10, wherein the source of casein is present and comprises sodium caseinate.

15. The pet treat of claim 10, wherein the pet treat further comprises at least one nutraceutical.

16. The pet treat of claim 15, wherein said nutraceutical is at least one member selected from the group consisting of probiotics, antioxidants, vitamins, pre-biotics, glucosamine and chondroitin.

17. The pet treat of claim 10, wherein the pet treat comprises:
    (a) 25 to 70 wt. % pre-gelatinized starch;
    (b) 5 to 55 wt. % polyol;
    (c) 5 to 40 wt. % spray dried protein;
    (d) 0 to 10 wt. % fat(s); and
    (e) 0 to 40 wt. % additive.

18. The pet treat of claim 10, wherein the pet treat comprises 8 to 50 wt. % glycerin.

19. The pet treat of claim 10, wherein the pet treat comprises 8 to 50 wt. % propylene glycol.

20. A treat comprising:
    a polyol;
    at least one member selected from the group consisting of a source of casein and a source of starch; and
    3 to 15 wt. % water,
    the treat having a water activity from 0.24 to 0.34.

21. The treat of claim 20, wherein the polyol is at least one member selected from the group consisting of glycerin, solid polyol and propylene glycol.

22. The treat of claim 20, wherein the source of casein is present and is at least one member selected from the group consisting of caseinate, milk powder, cheese powder, milk concentrate, milk isolate, evaporated milk, cheese, sour cream, yogurt, and mixtures thereof.

23. The treat of claim 20, wherein the source of casein is present and comprises sodium caseinate.

24. The treat of claim 20, wherein the source of starch is present and is at least one member selected from the group consisting of flour, finely ground grain, and pre-gelatinized starch.

25. The treat of claim 20, wherein the pet treat further comprises at least one nutraceutical.

26. The treat of claim 25, wherein said nutraceutical is at least one member selected from the group consisting of probiotics, antioxidants, vitamins, pre-biotics, glucosamine and chondroitin.

27. The treat of claim 20, wherein the pet treat comprises:
(a) 5 to 40 wt. % milk powder, cheese powder, milk concentrate, milk isolate, evaporated milk, cheese, sour cream, yogurt, or mixtures thereof;
(b) 35 to 60 wt. % flour;
(c) 5 to 55 wt. % polyol;
(d) 0 to 10 wt. % fat(s); and
(e) 0 to 40 wt. % additive.

28. The treat of claim 20, wherein the pet treat comprises:
(a) 25 to 70 wt. % pre-gelatinized starch;
(b) 5% to 55 wt. % polyol;
(c) 5 to 40 wt. % spray dried protein;
(d) 0 to 10 wt. % fat(s); and
(e) 0 to 40 wt. % additive.

29. The treat of claim 28, wherein at least one said additive is present and comprises at least one additive that is stable at a water content of from 3 to 15% and a temperature that does not exceed 55° C.

30. The treat of claim 29, wherein the additive comprises at least one member selected from the group consisting of natural colorants, fruit, vegetable, protein, pre-biotics, calcium stearate, enzymes, spray dried protein, and palatants.

31. The treat of claim 28, wherein the fat is present and comprises at least one member selected from the group consisting of corn oil, vegetable oil, soybean oil, medium chain triglycerides and animal fat.

32. The treat of claim 20, wherein the pet treat comprises 8 to 50 wt. % glycerin.

33. The treat of claim 20, wherein the pet treat comprises 8 to 50 wt. % propylene glycol.

34. A treat comprising:
a polyol;
a source of starch present in an amount of from 35 to 60%; and
a source of casein,
the treat having a water activity of from 0.24 to 0.34 and a fat content of from 0 to 10%.

35. The treat of claim 34, wherein the water activity is less than 0.3.

36. The pet treat of claim 1, wherein the source of casein is a dried yogurt.

37. The treat of claim 5, wherein the yogurt is a dried yogurt.

38. The treat of claim 20, wherein the source of casein is a dried yogurt.

39. The treat of claim 27, wherein the yogurt is a dried yogurt.

40. The pet treat of claim 6, wherein the additive is a protein.

41. The pet treat of claim 6, wherein the additive is a palatant.

42. The pet treat of claim 6, wherein the additive is calcium stearate.

43. The pet treat of claim 6, wherein the additive is a pre-biotic.

44. The pet treat of claim 6, wherein the additive is an enzyme.

45. The pet treat of claim 8, wherein at least one said fat is vegetable oil and the vegetable oil is corn oil or soybean oil.

46. The treat of claim 34, wherein the fat content is from 0 to 8%.

* * * * *